Jan. 12, 1954
B. F. BECKER
2,666,119
EXPLOSION-PROOF SWITCH APPARATUS
Filed Dec. 28, 1951
2 Sheets-Sheet 2
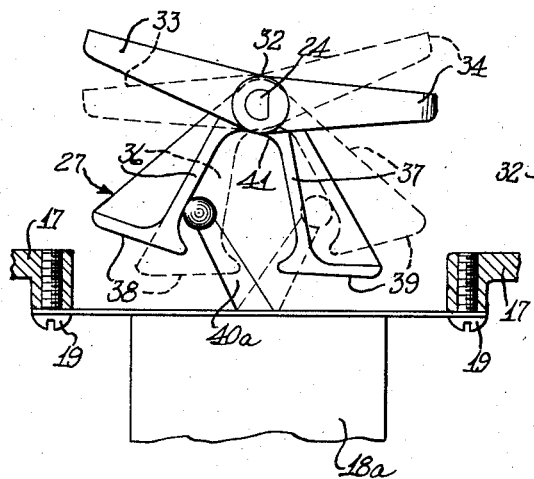
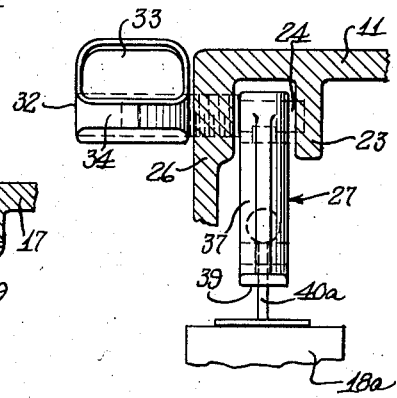
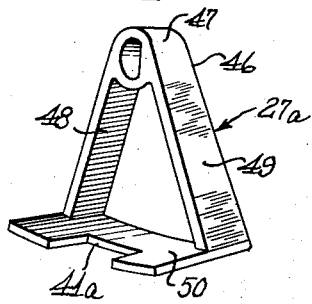
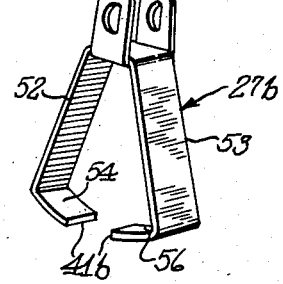
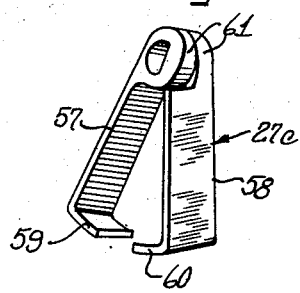
Inventor
Benjamin F. Becker

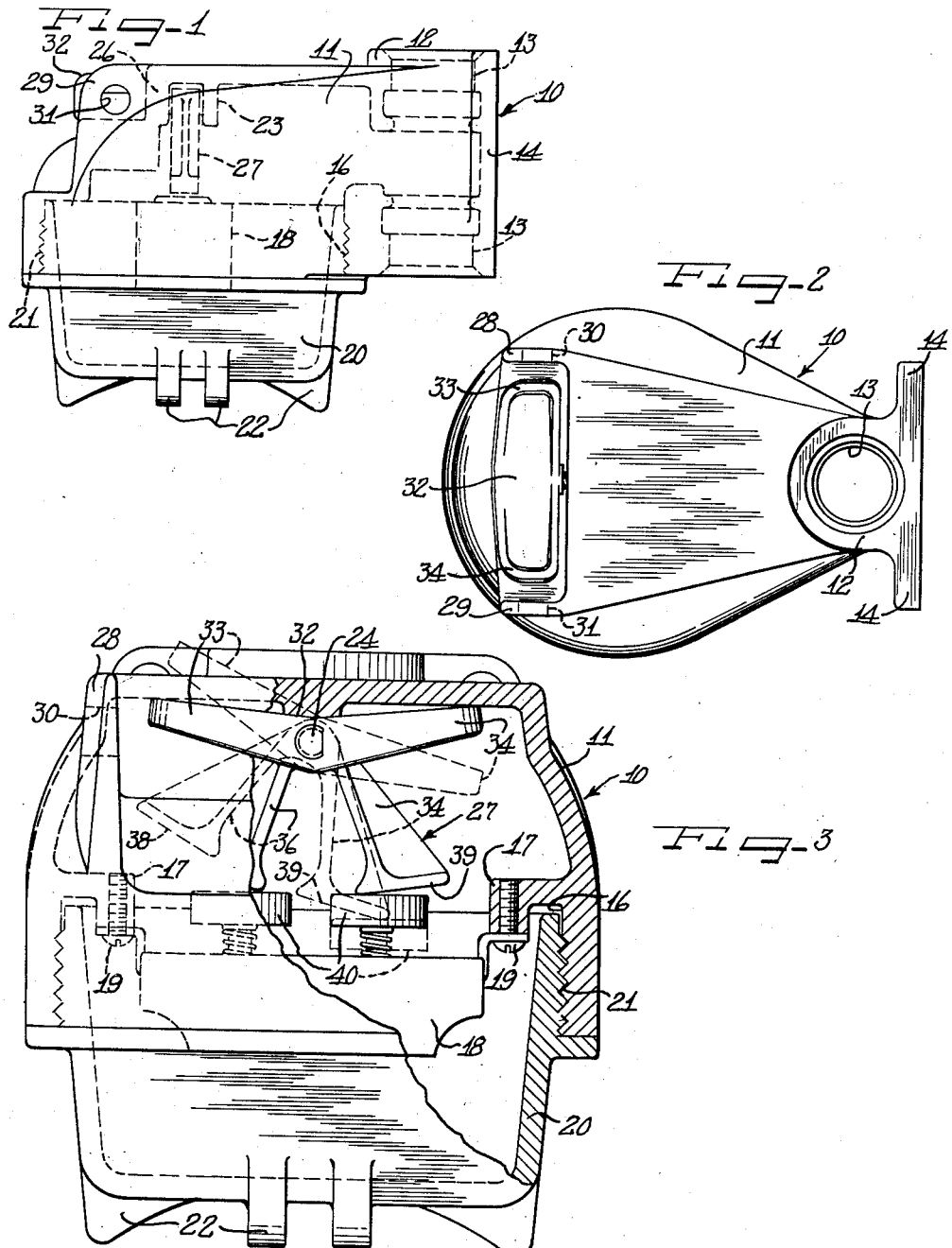

Patented Jan. 12, 1954

2,666,119

UNITED STATES PATENT OFFICE 2,666,119

EXPLOSION-PROOF SWITCH APPARATUS

Benjamin F. Becker, Chicago, Ill., assignor to The Pyle-National Company, Chicago, Ill., a corporation of New Jersey Application December 28, 1951, Serial No. 263,758

1 Claim. (Cl. 200—168)

This invention relates generally to switching apparatus and more particularly to an electrical switching apparatus particularly adapted for use in a hazardous location.

According to the general principles of the present invention, a housing is provided having conduit openings so that the housing may be incorporated in a conduit line. The housing is further provided with an access opening in one wall thereof. A plurality of spaced mounting means extend into the access opening and are adapted to receive in firm assembly therewith a switching apparatus which may be immersed in oil if desired. Since the switching apparatus is, in effect, positioned in the access opening and a portion of the switching apparatus extends outwardly of the access opening, a cup-shaped closure is provided for the access opening, the closure and the housing being assembled together with one another by means of a flame tight joint so as to render the entire enclosure explosion-proof. The closure is adapted to form a reservoir for a supply of oil to immerse the switch.

A shaft extends through a wall of the housing and is located generally adjacent the access opening. A switch actuator is corotatably carried by the shaft and projects away from the shaft towards the access opening, thereby to actuatingly engage the movable components of a switching apparatus assembled in the housing.

Since the requirements of usage in the field frequently vary, it may be necessary to employ the apparatus of the present invention in connection with either a push-button-type switching apparatus or a toggle-type switching apparatus. According to the principles of the present invention, the actuator accommodates both types of switching apparatus, thereby facilitating the interchangeable use of either type of switching apparatus, depending upon the particular usage requirements of the purchaser.

More particularly, the actuator comprises a member projecting away from the shaft and having spaced end portions forming camming surfaces to actuatingly engage the buttons of a push button switching apparatus. The actuator further includes recess means at the end portions adapted to receive the pin of a toggle-type switching apparatus.

The portion of the shaft extending through the wall of the housing is also rendered flame tight by providing a tortuous path between the shaft and the wall of the housing of greater length than the thickness of the housing. An actuator handle is assembled to the end of the shaft for co- rotation therewith and is located exteriorly of the housing between a pair of spaced flanges having apertures formed therein. The flanges not only provide protection for the actuating handle but also afford means to lock the actuating handle in selected position upon passing a locking means through one of the apertures in the flanges, thereby to prevent movement of the actuating handle beyond a prescribed limit.

It is an object of the present invention to provide an improved explosion-proof switching apparatus which may be economically produced from a reduced number of simplified components.

Another object of the present invention is to provide an explosion-proof enclosure for a switching apparatus which can be interchangeably employed with either a push button-type switching mechanism or a toggle-type switching mechanism.

Another object of the present invention is to provide an improved explosion-proof switching apparatus having means to prevent tampering by unauthorized personnel.

Many other advantages, features and additional objects of the present invention will become manifest to those versed in the art upon making reference to the detailed description which follows and the accompanying sheets of drawings, in which a preferred structural embodiment incorporating the principles of the present invention is shown by way of illustrative example.

On the drawings:

Figure 1 is an elevational view of an explosion-proof switching apparatus provided in accordance with the principles of the present invention and showing in phantom some of the structural details of the housing;

Figure 2 is a plan elevational view of the apparatus of Figure 1;

Figure 3 is a somewhat enlarged side elevational view of the apparatus shown in Figure 1 with parts broken away and with parts shown in cross section illustrating additional details of construction;

Figure 4 is a partial elevational view with parts shown in section and showing in full lines and dotted lines the operational use of the structure shown in Figure 3 with a toggle-type switching mechanism;

Figure 5 is a fragmentary enlarged cross-sectional view with parts shown in elevation showing additional details of structure of the actuator provided in accordance with the principles of the present invention;

Figure 6 is an isometric view of a modified actuator according to the principles of the present invention;

Figure 7 is an isometric view of another modified actuator according to the principles of the present invention; and Figure 8 is an isometric view of another modified actuator in accordance with the principles of the present invention.

As shown on the drawings:

The explosion-proof switching apparatus of the present invention is indicated generally at 10 and comprises a housing 11 having a boss 12 formed at one side thereof which is provided with conduit-receiving apertures 13, 13. The boss 12 is flanged as at 14 to facilitate mounting thereof on a mounting surface.

Using the planes of reference of the drawings, it will be noted that the housing 11 is provided with an access opening 16 and a plurality of spaced mounting means taking the form of a pair of diametrically opposed bosses 17 extend into the access opening to support a switching apparatus 18 adapted to be assembled in the housing 11, a pair of screws 19, 19 being provided threadedly engageable with threaded apertures in the bosses 17 to retain the switch apparatus 18 in firm assembly with the housing 11.

Because it may be desirable to immerse the switch apparatus 18 in a bath of oil, a portion thereof tends to extend outwardly of the access opening 16, and the closure for the access opening 16 preferably takes the form of a cup-shaped cover 20 adapted to form an oil reservoir. In order to render the switching apparatus 10 explosion-proof, the cover 20 is mounted on the housing 11 in flame tight relationship, for example, as shown in the present embodiment, a threaded connection 21 provides an extended tortuous path between the cover 20 and the housing 11 so that any flame tending to pass through the joint 21 will be cooled below the ignition temperature of an explosive mixture surrounding the switching apparatus 10. The exterior portion of the cover 20 is provided with a plurality of spaced tool-engaging bosses 22 to facilitate threading the cover 20 into the access opening 16 of the housing 11.

The wall of the housing 11 opposite the access opening 16 is provided with a depending boss 23. One face of the boss 23 is suitably recessed to receive and journal the end of a shaft 24, the other end of the shaft 24 extending exteriorly of the housing 11 through a vertically arranged wall portion 26. A switch actuator indicated generally at 27 is connected to the shaft 24 in corotatable assembly and extends away from the shaft 24 in the general direction of the access opening 16.

The wall portion 26 of the housing 11 and a portion of the shaft 24 are provided with mating thread means providing a tortuous path of greater length than the thickness of the wall portion 26, thereby rendering the joint between the shaft 24 and the wall portion 26 of the housing 11 flame tight. It will be understood that the threads between the shaft 24 and the wall portion 26 may be sufficiently loose to facilitate rotation of the shaft 24 relative to the housing, the number of threads between the wall portion 26 and the shaft 24, however, being sufficient to insure cooling of any flame tending to pass along such path below the ignition temperature of any explosive mixture surrounding the switching apparatus 10.

The exteriorly projecting portion of the shaft 24 is located between two spaced flanges 28 and 29 which are located on the exterior of the housing 11. The flanges 28 and 29 are apertured as at 30 and 31 respectively to facilitate reception of a locking means, for example, the shank of a padlock (not shown).

An actuating handle 32 is connected to the shaft 24 in corotatable assembly therewith and is provided with oppositely extending arm portions 33 and 34 which terminate adjacent the flanges 28 and 29 respectively. In order to selectively rotate the shaft 24, the actuator handle 32 is manipulated by depressing one or the other of the arms 33 and 34. In neutral position, that is, neutral position when used in conjunction with a push-button switch, the arms 33 and 34 are aligned relative to the housing 11 so as to be positioned above the level of the apertures 30 and 31 in the flanges 28 and 29, for example, see the full line position of Figure 3. In the dotted line position of Figure 3, the arm 34 is depressed so as to lie below the level of the aperture 31 in the flange 29. If it is desired to lock the actuator handle 32 in such a position, a locking means may be inserted through the aperture 31, thereby to preclude upward displacement of the arm 34.

The actuator 27 as embodied in Figures 1, 3, 4 and 5 comprises a yoke member conveniently fabricated as a casting and including a pair of angularly inclined arms 36 and 37 which extend away from the shaft 24 and terminate in end portions each forming a camming surface 38 and 39 adapted to actuatingly engage the buttons 40 of a push-button-type switching apparatus.

As shown in Figure 4, the actuator 27 can also be used in conjunction with a toggle-type switch indicated at 18a. Since the angularly inclined arms 36 and 37 are spaced away from one another, recess means 41 are provided by the actuator 27 to receive the pin 40a of the toggle-type switching mechanism 18a.

In view of the provisions described above, movement of the actuator handle 32 will result in a unison movement of the switch actuator 27 with a result that either type of switch, a push-button-type switch as shown in Figure 3 or a toggle-type switch as shown in Figure 4, will be actuatingly driven by the switch actuator 27, the camming surfaces 38 and 39 cooperating with the push-buttons 40 or the arms 36 and 37 cooperating with the pin 40a received in the recess 41.

In the embodiments of Figures 6, 7 and 8, alternative structural forms of the actuator 27 are shown. In Figure 6 is shown an actuator 27a comprising a triangularly shaped member 46 having an apical portion 47 adapted to be connected in corotatable assembly with the shaft 24 and including a pair of angularly extending arms 48 and 49 terminating in a shoe 50 providing the spaced camming surfaces for actuating the buttons of a push-button type switch. The shoe 50 is provided with a recess 41a to cooperatively engage the pin of a toggle-type switch.

In Figure 7 is shown an actuator 27b comprising a stamping having a pair of upstanding ears 51 suitably constructed to be connected in corotatable assembly with the shaft 24. A pair of angularly extending arms 52 and 53 terminate in offset fingers 54 and 56 which are shaped to provide the camming surfaces necessary to actuate the buttons of a push-button-type switching apparatus. The fingers 54 and 56 are separated from one another to provide a recess 41b for receiving the pin of a toggle-type switch.

In Figure 8 an actuator 27c is shown comprising two separate arm members 57 and 58. On one end of the arm 57 an offset finger 59 is provided to form the necessary cam surface for actuating one of the buttons of a push-button switch. The arm 58 is also provided with an offset finger 60 forming the necessary cam surface for actuating a button of a push-button-type switch.

On the opposite ends of the arms 57 and 58 is provided mating apertured bosses 61 adapted to be locked in corotatable assembly with the shaft 24 and constructed to position the arms 57 and 58 in angularly extending assembly relative to the shaft 24.

Although various minor structural modifications to the preferred embodiment herein disclosed by way of illustrative example might be suggested by those versed in the art, it should be understood that I wish to embrace within the scope of the patent warranted hereon all such modifications as reasonably and properly come within the scope of my contribution to the art.

I claim as my invention:

An explosion-proof switching apparatus comprising a conduit receiving housing having a cylindrical bottom wall providing a screw threaded access opening, a switching apparatus carried by said housing and extending into an accessible position in said access opening, a cup-shaped closure member for said access opening providing a receptacle forming an oil reservoir and including thread means engaging said bottom wall to couple said closure member and said housing in flame-proof assembly and to draw up the closure member relative to the housing to immerse the switching apparatus in the oil reservoir, a shaft threadedly journaled in one wall of said housing and having a switch actuator member inside of said housing extending toward said access opening, said switch actuator member having spaced end portions forming camming surfaces for engaging the buttons of a push button switch, said spaced end portions also providing a toggle pin recess therebetween, said end portions having opposed spaced apart abutment surfaces for engaging a toggle pin of a toggle switch on opposite sides of said toggle pin recess, said shaft having a manual actuator member connected thereto outside of said housing to displace said actuator in unison therewith, said switch actuator effecting an operative connection with said switching apparatus whether it be of the push button or toggle type.

BENJAMIN F. BECKER.

References Cited in the file of this patent

UNITED STATES PATENTS

| Number | Name | Date |
| --- | --- | --- |
| 1,924,351 | Doddridge | Aug. 29, 1933 |
| 2,029,599 | Tornblom | Feb. 4, 1936 |
| 2,290,516 | Willmann | July 21, 1942 |